United States Patent [19]
Jones

[11] Patent Number: 5,725,272
[45] Date of Patent: Mar. 10, 1998

[54] DRAIN ASSEMBLY FOR ACOUSTIC BAFFLE SYSTEM

[75] Inventor: David Jones, Northville, Mich.

[73] Assignee: SIKA Corporation, Southfield, Mich.

[21] Appl. No.: 670,151

[22] Filed: Jun. 27, 1996

[51] Int. Cl.$^6$ .................................................. B60R 27/00
[52] U.S. Cl. .............................. 296/208; 296/38; 277/26
[58] Field of Search .................... 296/208, 901, 296/187, 38; 52/145, 309.4, 404.1; 4/292; 277/1, 26

[56] References Cited

U.S. PATENT DOCUMENTS

| | | | |
|---|---|---|---|
| 3,143,373 | 8/1964 | Fordyce | 296/208 |
| 3,606,446 | 9/1971 | Leslie | |
| 3,701,560 | 10/1972 | Emmerson | 296/208 |
| 3,711,147 | 1/1973 | Higuchi et al. | |
| 4,071,273 | 1/1978 | Hack et al. | 296/154 X |
| 4,216,707 | 8/1980 | Pennington | 296/154 X |
| 4,747,636 | 5/1988 | Harasaki et al. | 296/186 |
| 5,344,208 | 9/1994 | Bien et al. | 296/187 |
| 5,482,343 | 1/1996 | Bradac | 296/39.1 |
| 5,506,025 | 4/1996 | Otto et al. | 428/98 |
| 5,642,914 | 7/1997 | Takabatake | 296/187 |

FOREIGN PATENT DOCUMENTS

| | | | |
|---|---|---|---|
| 3021388 | 12/1981 | Germany | 296/208 |
| 4110280 | 4/1992 | Japan | 296/187 |

*Primary Examiner*—Dennis H. Pedder
*Attorney, Agent, or Firm*—Hovey, Williams, Timmons & Collins

[57] ABSTRACT

An acoustic baffle apparatus is provided for sealing a cavity of a vehicle body at a predetermined cross section of the cavity. The apparatus includes a piece of heat expandable sealing material that is formed in a shape corresponding to but smaller than the shape of the cross section of the cavity. The sealing material has an activation temperature at which the material expands, and a support element can be provided beneath the piece of sealing material for supporting it. A drain assembly is secured to the support element and extends upward past the piece of sealing material. The drain assembly includes an outer side wall defining a drain passage having an upper end above the support element and a lower end beneath the support element, and a plurality of baffles are secured within the drain passage for defining a serpentine path between the upper and lower ends. A flange is spaced above the support element and the piece of sealing material, and accommodates expansion of the sealing material when the apparatus is subjected to the activation temperature and directs the sealing material outward away from the upper end of the passage.

16 Claims, 2 Drawing Sheets

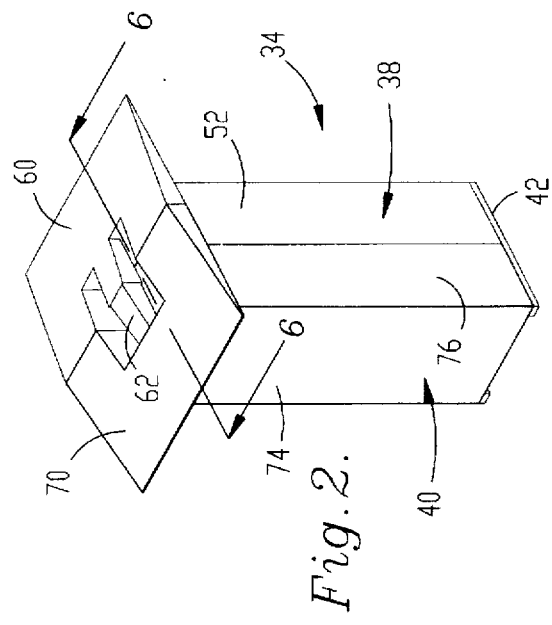
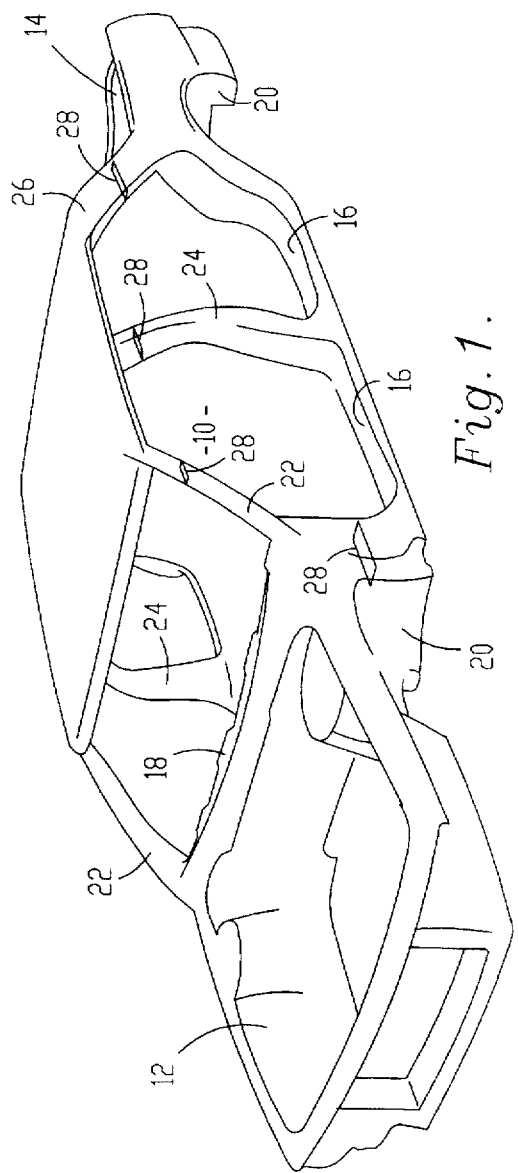
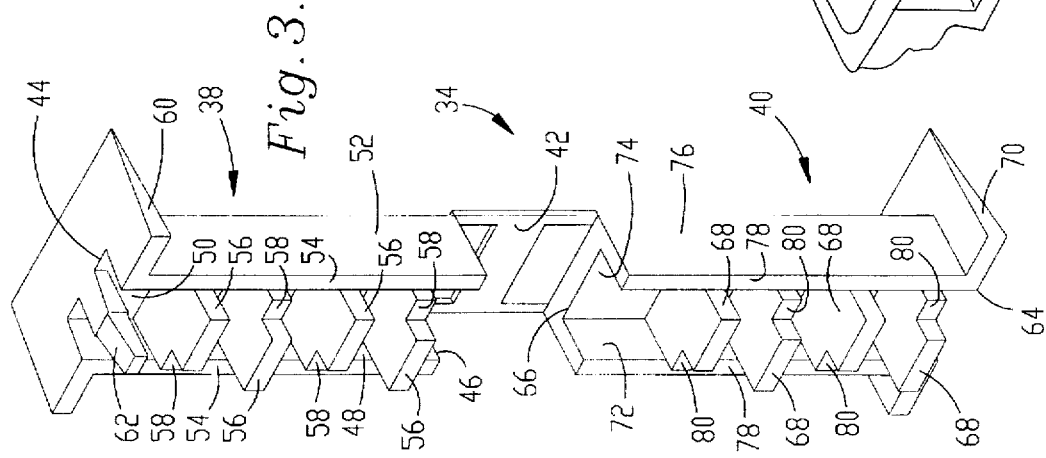

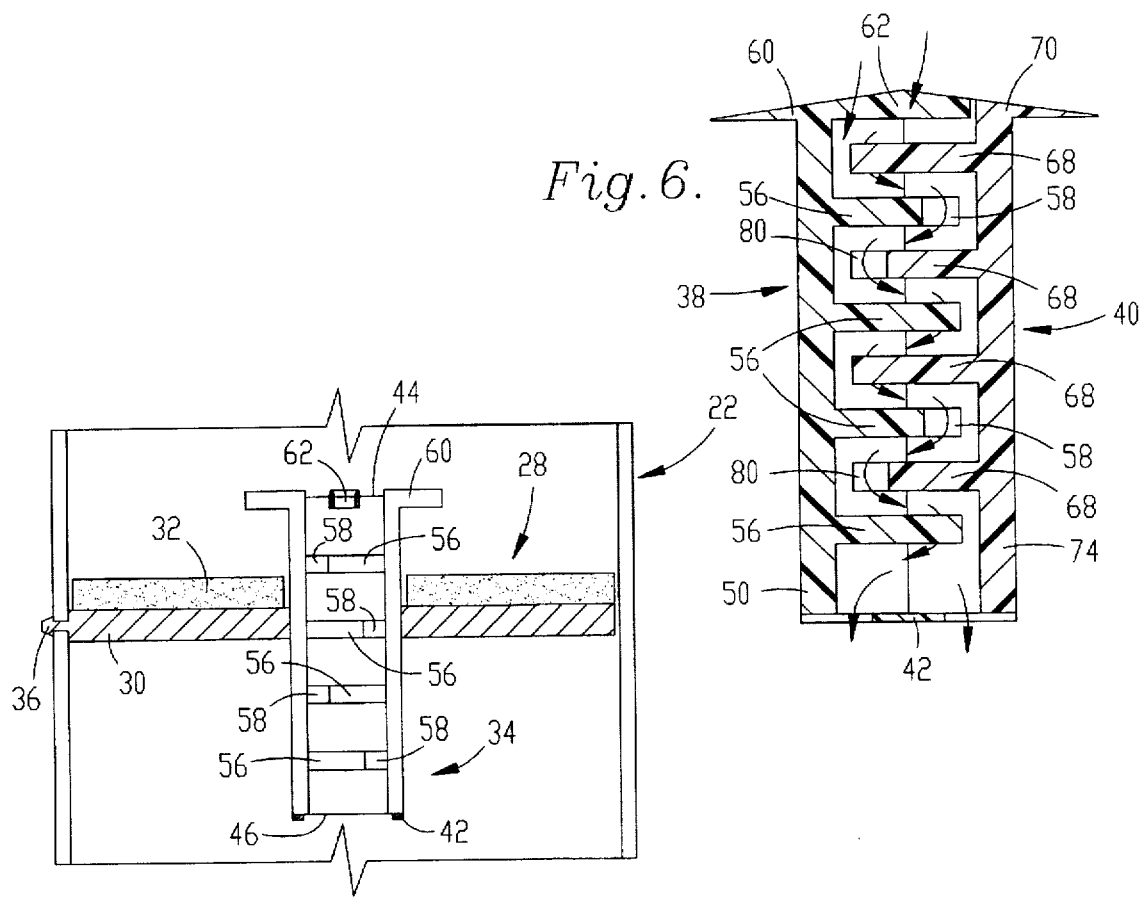
Fig.6.
Fig.4.
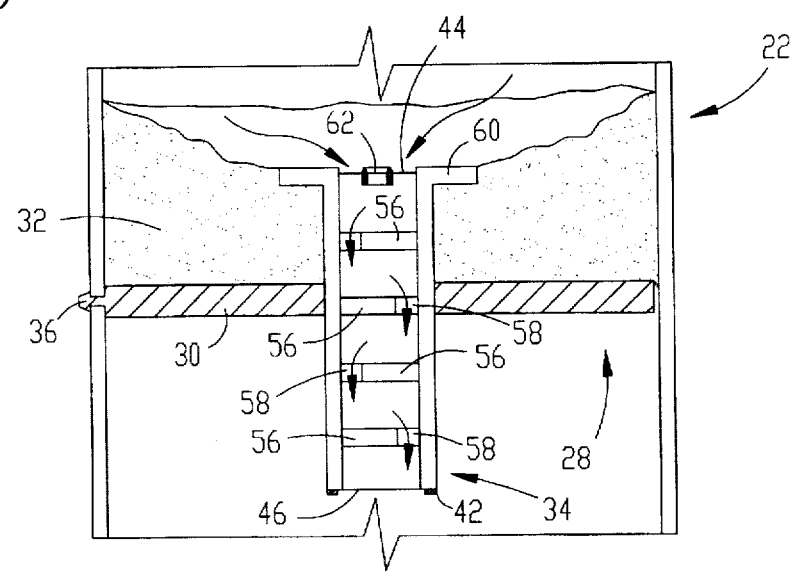
Fig.5.

DRAIN ASSEMBLY FOR ACOUSTIC BAFFLE SYSTEM

BACKGROUND OF THE INVENTION

1. Field of the Invention

The present invention relates generally to expandable baffle products for sealing the cavities of automobiles and other articles of manufacture and, more particularly, to a baffle apparatus including a drain assembly for draining water from the cavity of an automobile.

2. Discussion of the Prior Art

During the fabrication of automobiles, trucks and similar over-the-road vehicles, many body components present cavities which require sealing to prevent ingress of moisture and contaminants which can cause corrosion of the body parts. This is especially true with respect to unibody structures in which a heavy frame is replaced with a structurally designed space frame that inherently presents a number of moisture and contaminant collecting cavities. These cavities also serve as passages which attenuate noise and other sounds transmitted through the cavities during normal use of the vehicle.

For example, the upright post structure of a vehicle's body defining a portion of a respective window opening presents an elongated passage or cavity which can collect moisture and contaminants, especially when the vehicle body includes a sunroof or the like. The post structures also transmit annoying sounds unless the passages or cavities defined thereby are at least partially filled with a sealant material that blocks entrance of moisture and debris, and that also serves as a baffle for muting sounds that would otherwise be transmitted along the length of the passages or cavities.

OBJECTS AND SUMMARY OF THE INVENTION

It is an object of the present invention to provide an acoustic baffle apparatus having a drain assembly that drains fluid from above the apparatus within the pillar cavity, and baffles noise passing through the apparatus.

It is another object of the present invention to provide a baffle apparatus including a piece of sealing material that is heated to an activation temperature and expands to fill a particular cross section of the cavity, wherein the drain assembly is secured to a support structure of the apparatus and is formed of a material that maintains its shape when the sealing material is activated.

Yet another object of the invention is to provide a baffle apparatus in which the drain assembly includes a flange that is spaced above the support element by a distance sufficient to accommodate some expansion of the sealing material, wherein the flange directs sealing material during activation to define a sump.

In accordance with these and other objects evident from the following description of a preferred embodiment of the invention, an acoustic baffle apparatus is provided for sealing a cavity of a vehicle body at a predetermined cross section of the cavity. The apparatus includes a piece of heat expandable sealing material, a support element, and a drain assembly. The sealing material is formed in a shape corresponding to but smaller than the shape of the cross section of the cavity, and possesses an activation temperature at which the material expands. The support element is disposed beneath the piece of sealing material and supports the piece of sealing material at the predetermined cross section while the apparatus is subjected to the activation temperature and the sealing material expands to seal the cavity at the cross section. The support element includes a fastening means for fastening the support element in place within the cavity at the cross section.

The drain assembly secured to the support element and extends upward past the piece of sealing material. The drain assembly includes an outer side wall defining a drain passage having an upper end above the support element and a lower end beneath the support element, a plurality of baffles secured to the side wall within the drain passage for defining a serpentine path between the upper and lower ends, and an upper flange protruding circumferentially from the side wall adjacent the upper end. The flange is spaced above the support element and the piece of sealing material before the apparatus is subjected to the activation temperature so that the flange accommodates expansion of the sealing material when the apparatus is subjected to the activation temperature. The flange also directs the sealing material outward away from the upper end of the passage so that fluid within the cavity above the apparatus is free to drain from the cavity while noise passing through the drain assembly is baffled. The support element and drain assembly are formed of a material having a melting point higher than the activation temperature so that they maintain their shape during and after activation of the sealing material.

By providing a drain assembly and acoustic baffle apparatus in accordance with the present invention, numerous advantages are realized. For example, by providing a drain passage within which a plurality of baffles are disposed, it is possible to employ the assembly in a baffle apparatus to drain water from within the cavity without sacrificing the noise muting properties of the apparatus.

In addition, by constructing a baffle apparatus with a drain assembly having a flange that is spaced above both the support element and the sealing material prior to heat activation, the flange accommodates expansion of the sealing material and directs the sealing material upward and outward away from the passage during activation to define a sump in which water is collected and drained from the cavity.

BRIEF DESCRIPTION OF THE DRAWING FIGURES

The preferred embodiment of the present invention is described in detail below with reference to the attached drawing figures, wherein:

FIG. 1 is a perspective view of an automobile body, illustrating various pillars within which an acoustic baffle apparatus incorporating the drain assembly of the present invention may be utilized;

FIG. 2 is a perspective view of a drain assembly constructed in accordance with the preferred embodiment;

FIG. 3 is a perspective view of a molded body forming a part of the drain assembly;

FIG. 4 is a schematic view of an acoustic baffle apparatus incorporating the drain assembly, illustrating the apparatus prior to expansion of a piece of sealing material forming a part of the apparatus;

FIG. 5 is a schematic view of the apparatus, illustrating the apparatus prior to expansion of the sealing material; and FIG. 6 is a sectional view of the apparatus, illustrating a drain passage defined by the drain assembly.

DETAILED DESCRIPTION OF THE PREFERRED EMBODIMENT

An automobile body is illustrated in FIG. 1, and includes several interconnected, hollow frame elements or pillars that define a passenger compartment 10, engine compartment 12, trunk 14, doorways 16, windows 18 and wheel wells 20.

It is conventional to refer to the pillars by letter, with the front side pillars 22 being the "A" pillars, the middle side pillars 24 being the "B" pillars, the rear side pillars 26 being the "C" pillars, etc. working backward on the body structure. Alternately, pillars are referenced by the shape of the pillar or by the function they perform. For example, the rear pillar 26 extending between the trunk and the roof of the body is sometimes referred to as a sail pillar because it looks like a sail, and the front pillar 22 extending upward in front of the doors of the automobile is called a wind shield pillar because it receives the front wind shield for the vehicle.

An acoustic baffle apparatus constructed in accordance with the preferred embodiment of the present invention can be utilized in any of the A, B, and C pillars, or elsewhere in the body. Likewise, the apparatus may be utilized in any other article of manufacture for sealing a cavity within the article while permitting drainage of the cavity.

The baffle apparatus 28 is shown in FIG. 4, and broadly includes a support element 30, piece of sealing material 32, and a drain assembly 34. The piece of sealing material is adapted to seal a predetermined cross section of the pillar cavity, and is formed of a shape corresponding to but slightly smaller than the cavity cross section. This construction permits placement of the apparatus within the pillar while permitting the sealing material to expand radially to seal against the pillar upon heating to an activation temperature. The space resulting from this size difference between the piece of sealing material and the cavity allows fluid drainage during the washing, pre-preparation and priming process that the automobile encounters during assembly.

The sealing piece 32 is preferably injection molded in the desired shape, and includes opposed planer surfaces that are spaced from one another by the thickness of the material. A central hole is molded or otherwise formed in the sealing piece and functions as a means for receiving the drain assembly. The sealing piece is formed of a dry, initially non-tacky material that becomes tacky upon expansion so that the sealing material adheres to the pillar within the cavity when the apparatus is heated to the activation temperature at which the material expands. An exemplary material is disclosed in U.S. Pat. No. 5,266,133, to Hanley et al., which is incorporated herein by this reference. Such a material is marketed under the name SIKALASTOMER 240 by Sika Corporation. However, any other suitable sealing material may be employed so long as it is able to expand sufficiently upon activation to seal the cross section of the cavity within which it is positioned.

One necessary characteristic of the sealing material is that the material must possess an activation temperature lower than or equal to the temperature at which the automobile body is baked during manufacture. For example, it is conventional to employ a bake temperature of about 177° C. (350° F.) in the manufacture of automobiles. Accordingly, the preferred sealing material for use in the manufacture of automobiles must possess an activation temperature lower than this value, e.g. 149° C. (300° F.).

The support element 30 is adapted to support the piece of sealing material at the predetermined cross section within the pillar cavity while the automobile body is subjected to the activation temperature, and includes a body having a shape corresponding generally to the shape of the cavity cross section, and a means for fastening the support element in place within the cavity at the cross section. The body includes a central hole aligned with the hole in the sealing piece and sized for receipt of the drain assembly. The fastening means preferably includes a plurality of clips 36 or the like that are received in depressions or holes formed in the pillars to hold the baffle apparatus in place during assembly of the automobile.

The support element is formed of a material having a melting point that is higher than both the activation temperature of the sealing material and the bake temperature to which the automobile body is to be exposed. Preferably, the temperature at which the material of the support element softens is also above the bake temperature. Thus, the support element is able to substantially maintain its shape before, during and after the baking operation, and to support the sealing piece so that the sealing material expands to fill the cross section of the cavity at which the apparatus is supported.

The support element 30 is formed of a moldable material that is pliable so that special handling of the apparatus is not required and the apparatus may be subjected to bending forces without being cracked or permanently deformed. An exemplary material is a black, heat stabilized lubricated 33% glass-reinforced 66 nylon having a heat deflection temperature at 1.8 MPa of 240° C. (464° F.), and a melting point of 262° C. (504° F.). Such a material is marketed as NYLIND 51HSL BK001 by DuPont. However, other similar materials may be used depending upon the desired physical characteristics thereof.

The drain assembly 34 is illustrated in FIG. 2, and broadly includes a body formed by a pair of side pieces 38, 40 held together by a connector 42. The body is formed of a material having a melting point that is higher than both the activation temperature of the sealing material and the bake temperature to which the automobile body is to be exposed. Preferably, the temperature at which the material of the body softens is also above the bake temperature. Thus, the support element and drain assembly are able to substantially maintain their shape before, during and after the baking operation. As shown in FIG. 3, the body is preferably formed as a unitary piece of the same moldable material that is used to form the support element. However, separate pieces may be used to construct the drain assembly.

The side piece 38 of the body includes an elongated C-shaped side wall section that defines an interior passage channel having longitudinally opposed upper and lower ends 44, 46. The side wall section presents three walls 48, 50, 52, and the walls 48, 52 define interior edges 54 of the channel. Thus, the channel presents an open side and three closed sides, wherein the width of the channel is defined as the distance between the two walls 48, 52 and the depth of the channel is defined as the distance between the wall 50 and a plane connecting the edges 54 together.

Four transverse baffles 56 are formed in the side piece 38 within the channel and are spaced longitudinally from one another. Each baffle blocks the entire channel and protrudes beyond the edges 54 by a distance less than the depth of the channel. The protruding portion of each baffle presents a pair of laterally spaced corners, and a notch 58 is formed in one of the corners. Preferably, the notch in each baffle is formed in the corner opposite to that in which the notch in each adjacent baffle is formed.

A flange section 60 is provided at one end of the side piece 38 adjacent the upper end of the channel, and presents a generally planer bottom surface extending in a direction transverse to the length of the channel, and an upper surface that is tapered outward and downward toward the lower surface. The resulting wedge-shaped flange section surrounds the upper end of the channel. A tab 62 protrudes from the wall 50 at the upper end of the channel and protrudes from the channel beyond the edges 54 by a distance slightly less than the depth of the channel. The tab is of a width less than about one-half the width of the channel and defines an opening into which water can drain into the channel.

The side piece 40 is similar to the side piece 38, and includes an elongated C-shaped side wall section that defines an interior passage channel having longitudinally opposed upper and lower ends 64, 66, a plurality of baffles 68, and a flange section 70. The side wall section presents three walls 72, 74, 76, and the walls define interior edges 78 of the channel. Thus, the channel presents an open side and three closed sides, wherein the width of the channel is defined as the distance between the two walls 72, 76, and is equal to the width of the channel of the side piece 38, and the depth of the channel is defined as the distance between the wall 74 and a plane connecting the edges 78 together, and is equal to the depth of the channel of the side piece 38. The flange section 70 is provided at the upper end of the channel, and is identical to the flange section 60 formed in the side piece 38.

The baffles 68 are spaced longitudinally from one another, and each baffle protrudes beyond the edges by a distance less than the depth of the channel. The protruding portion of each baffle presents a pair of laterally spaced corners, and a notch 80 is formed in one of the corners. Preferably, the notch in each baffle is formed in the corner opposite to that in which the notch in each adjacent baffle is formed.

As shown in FIG. 6, in addition to the baffles 56, 68 of each side piece being spaced longitudinally from the other baffles on that piece, they are also spaced longitudinally from the baffles of the other side piece. Because the baffles of each side piece protrude from the channel of that piece by a distance less than the depth thereof, the baffles do not completely block the channel of the opposing side piece upon assembly of the side pieces together and a serpentine path is defined through the passage defined by the two channels. In addition, the notches in the baffles are offset from one another along the length of the passage to further disrupt the flow path through the drain assembly.

Returning to FIG. 3, the connector 42 is an H-shaped piece of material that extends between and is connected to the walls of the side pieces. The connector is preferably offset from the walls so that a pair of parallel lines of weakness are defined between the connector and the side pieces. As such, the connector is hingedly secured to each side piece and permits the side pieces to be pivoted about the connector into facing relation with one another. When assembled, the edges 54, 78 of the side pieces mate with one another and the baffles extend into the opposing channel and grip the walls to hold the two side pieces together. If desired, an adhesive may be used to secure the side pieces in place. The connector defines a pair of openings at the lower end of the passage for draining water from the passage during use of the baffle apparatus. The two flange sections 60, 70 together form a single flange surrounding the upper end of the passage.

With reference to FIG. 4, the drain assembly is received in the holes of the sealing piece 32 and the support element 30, and is secured to the support element by an adhesive or other suitable means with the flange spaced above the support element by a distance greater than the thickness of the sealing piece. The particular height of the flange above the support element is selected to achieve the desired function of accommodating some but not all of the vertical expansion of the sealing material so that as the material expands, it engages the underside of the flange and is directed away from the upper opening of the passage. Thus, continued expansion of the sealing material beyond the flange extends upward and outward from the flange to define a sump within which water is collected and drained from the cavity.

During assembly of the automobile, the acoustic baffle apparatus is inserted into one of the pillars of the automobile body and remains in place during subsequent assembly operations. Any fluid that gets into the pillar during assembly, e.g. during washing, pre-preparation or priming, drains around the edges of the sealing piece and from the pillar.

When the automobile is subjected to a bake temperature, typically of about 177° C. (350° F.), the sealing material is activated and expands to fill the cross section of the pillar at which the baffle apparatus is positioned, as shown in FIG. 5. At the same time, the sealing material expands longitudinally within the cavity against the flange and is directed outward away from the upper opening of the passage.

Subsequent to manufacture, the acoustic baffle apparatus effectively serves as a baffle for muting sounds that would otherwise be transmitted through the pillar. At the same time, water or other fluid that enters the cavity above the baffle apparatus is drained through the drain assembly 34. The baffle structure provided within the passage of the drain assembly permits this drainage to occur while presenting an acoustic baffle structure that, like the sealing material, mutes noise transmitted through the pillar. Thus, the drain assembly achieves two functions by allowing drainage while functioning as an acoustic baffle.

Although the present invention has been described with reference to the preferred embodiment, it is noted that equivalents may be employed and substitution made herein without departing from the scope of the invention as recited in the claims. For example, it is possible to form the piece of sealing material in a shape that would permit it to be secured in place within a pillar of the automobile body, or within another article of manufacture., without the need for a support element. In this alternate embodiment, the drain assembly would be supported directly by the piece of sealing material so that upon heat activation of the sealing material, the drain assembly would provide drainage of the cavity above the apparatus while functioning as an acoustic baffle.

What is claimed is:

1. A drain assembly for use with an acoustic baffle apparatus for sealing a cavity of a vehicle body at a predetermined cross section of the cavity, wherein the acoustic baffle apparatus includes a piece of heat expandable sealing material and a support element for supporting the piece of sealing material at the predetermined cross section while the sealing material is heated and expands to seal the cavity at the cross section, the drain assembly comprising:

a body having a pair of side pieces that are connected together to form a drain passage having upper and lower ends, each side piece including a C-shaped sidewall section and a plurality of baffles secured to the sidewall section in spaced relation to one another defining a serpentine path between the upper and lower ends; and an upper flange protruding circumferentially from the side wall adjacent the upper end for directing the sealing material outward away from the upper end of the passage when the material is heated and expands, the drain assembly draining fluid from within the cavity above the apparatus and baffling noise passing through the drain passage.

2. A drain assembly as recited in claim 1, wherein the body is formed as a single molded piece of material, and includes a connector extending between the side pieces.

3. A drain assembly as recited in claim 2, wherein the connector is located adjacent the lower end of the passage and includes an opening for permitting fluid to drain from the passage.

4. A drain assembly as recited in claim 1, wherein the sealing material has an activation temperature at which the material expands and the drain assembly is formed of a material having a melting point higher than the activation temperature of the sealing material.

5. A drain assembly as recited in claim 1, wherein the passage defines a width, and each baffle is of a width equal to the width of the passage.

6. A drain assembly as recited in claim 5, wherein the passage defines a depth, and each baffle is of a depth less than the depth of the passage.

7. A drain assembly as recited in claim 1, wherein the passage defines a width and a depth, and each baffle is of a width equal to the width of the passage and of a depth less than the depth of the passage.

8. A drain assembly as recited in claim 7, wherein each baffle includes a notch defining a fluid passageway past the baffle, the notch of each baffle being offset from the notches in adjacent baffles.

9. An acoustic baffle apparatus for sealing a cavity of a vehicle body at a predetermined cross section of the cavity, the apparatus comprising:

a piece of heat expandable sealing material having an activation temperature at which the material expands;

a support element beneath the piece of sealing material for supporting the piece of sealing material at the predetermined cross section while the apparatus is subjected to the activation temperature and the sealing material expands to seal the cavity at the cross section;

a fastening means for fastening the support element in place within the cavity at the cross section; and a drain assembly secured to the support element and extending upward past the piece of sealing material, the drain assembly including a body having a pair of side pieces that are connected together to form a drain passage having an upper end above the support element and a lower end beneath the support element, each side piece including a C-shaped side wall section and a plurality of baffles secured to the side wall section in spaced relation to one another, wherein the baffles of each side piece are spaced from the baffles of the other side piece when the side pieces are connected together for defining a serpentine path between the upper and lower ends of the drain passage, and an upper flange protruding circumferentially from the body adjacent the upper end of the drain passage, the flange being spaced above the support element and the piece of sealing material before the apparatus is subjected to the activation temperature so that the flange accommodates expansion of the sealing material when the apparatus is subjected to the activation temperature and directs the sealing material outward away from the upper end of the passage so that fluid within the cavity above the apparatus is drained while noise passing through the drain assembly is baffled, the support element and drain assembly being formed of a material having a melting point higher than the activation temperature.

10. A drain assembly as recited in claim 9, wherein the body is formed as a single molded piece of material, and includes a connector extending between the side pieces.

11. A drain assembly as recited in claim 10, wherein the connector is located adjacent the lower end of the passage and includes an opening for permitting fluid to drain from the passage.

12. A drain assembly as recited in claim 9, wherein the sealing material has an activation temperature at which the material expands and the drain assembly is formed of a material having a melting point higher than the activation temperature of the sealing material.

13. A drain assembly as recited in claim 9, wherein the passage defines a width, and each baffle is of a width equal to the width of the passage.

14. A drain assembly as recited in claim 13, wherein the passage defines a depth, and each baffle is of a depth less than the depth of the passage.

15. A drain assembly as recited in claim 9, wherein the passage defines a width and a depth, and each baffle is of a width equal to the width of the passage and of a depth less than the depth of the passage.

16. A drain assembly as recited in claim 15, wherein each baffle includes a notch defining a fluid passageway past the baffle, the notch of each baffle being offset from the notches in adjacent baffles.

* * * * *